US009832381B2

United States Patent
Osborne

(10) Patent No.: US 9,832,381 B2
(45) Date of Patent: Nov. 28, 2017

(54) OPTICAL IMAGE STABILIZATION FOR THIN CAMERAS

(71) Applicant: QUALCOMM Incorporated, San Diego, CA (US)

(72) Inventor: Thomas Wesley Osborne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/848,127

(22) Filed: Sep. 8, 2015

(65) Prior Publication Data

US 2016/0127646 A1  May 5, 2016

Related U.S. Application Data

(60) Provisional application No. 62/073,856, filed on Oct. 31, 2014.

(51) Int. Cl.
*H04N 5/232* (2006.01)
*G02B 27/64* (2006.01)
(Continued)

(52) U.S. Cl.
CPC ....... *H04N 5/23258* (2013.01); *G02B 27/646* (2013.01); *H04N 5/2251* (2013.01);
(Continued)

(58) Field of Classification Search
CPC ............. H04N 5/23258; H04N 5/2251; H04N 5/2252; H04N 5/2254; H04N 5/23238;
(Continued)

(56) References Cited

U.S. PATENT DOCUMENTS 3,698,803 A   10/1972   Watanuki
4,114,171 A    9/1978   Altman
(Continued)

FOREIGN PATENT DOCUMENTS

CN   101201459 A    6/2008
CN   101571666 A   11/2009
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

*Primary Examiner* — Nicholas Giles

(57) ABSTRACT

Systems and methods for optical image stabilization of thin cameras are disclosed. An image stabilization system for a camera system includes a stabilization platform configured to support a camera system, a camera housing, a fulcrum rotationally and pivotally connecting the stabilization platform to the camera housing, the fulcrum configured such that the stabilization platform can tilt and rotate relative to the camera housing in at least one of the pitch, roll, and yaw directions, at least one gyroscope rigidly connected to the stabilization platform, and at least one actuator coupled to the stabilization platform and configured to cause tilting or rotation of the stabilization platform in at least one of the pitch, roll, and yaw directions.

31 Claims, 6 Drawing Sheets

(51) Int. Cl.
*H04N 5/225* (2006.01)
*H04N 5/247* (2006.01)

(52) U.S. Cl.
CPC ......... *H04N 5/2252* (2013.01); *H04N 5/2254* (2013.01); *H04N 5/23238* (2013.01); *H04N 5/23287* (2013.01); *H04N 5/247* (2013.01)

(58) Field of Classification Search
CPC ... H04N 5/23287; H04N 5/247; G02B 27/646
See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A | 3/1993 | Kaneko et al. | |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A | 8/1998 | Nalwa | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 | 7/2002 | Wick et al. | |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1 | 8/2004 | Avinash | |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2 | 2/2005 | Yokoi et al. | |
| 6,861,633 B2 | 3/2005 | Osborn | |
| 6,862,364 B1 | 3/2005 | Berestov | |
| 6,987,534 B1 | 1/2006 | Seta | |
| 6,992,700 B1* | 1/2006 | Sato | G03B 5/00 348/208.11 |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson et al. | |
| 7,860,214 B1 | 12/2010 | Haff | |
| 7,893,957 B2 | 2/2011 | Peters et al. | |
| 7,961,398 B2 | 6/2011 | Tocci | |
| 7,978,222 B2* | 7/2011 | Schneider | G03B 17/00 348/208.1 |
| 8,004,557 B2 | 8/2011 | Pan | |
| 8,098,276 B2 | 1/2012 | Chang et al. | |
| 8,115,813 B2 | 2/2012 | Tang | |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2* | 5/2013 | Ollila | G03B 3/10 310/12.14 |
| 8,482,813 B2 | 7/2013 | Kawano et al. | |
| 8,791,984 B2 | 7/2014 | Jones et al. | |
| 8,836,693 B2 | 9/2014 | Katano | |
| 8,928,988 B1 | 1/2015 | Ford et al. | |
| 8,988,564 B2 | 3/2015 | Webster et al. | |
| 9,049,375 B2* | 6/2015 | Wade | G03B 5/00 |
| 9,055,208 B2* | 6/2015 | Kim | H04N 5/2254 |
| 9,185,296 B2* | 11/2015 | Wade | G03B 5/00 |
| 9,264,610 B2 | 2/2016 | Duparre | |
| 9,316,810 B2 | 4/2016 | Mercado | |
| 9,332,188 B2* | 5/2016 | Takei | G03B 5/00 |
| 9,609,210 B2 | 3/2017 | Djordjevic et al. | |
| 2001/0028482 A1 | 10/2001 | Nishioka | |
| 2002/0070365 A1 | 6/2002 | Karellas | |
| 2002/0136150 A1 | 9/2002 | Mihara et al. | |
| 2003/0024987 A1 | 2/2003 | Zhu | |
| 2003/0034395 A1 | 2/2003 | Tsikos et al. | |
| 2003/0038814 A1 | 2/2003 | Blume | |
| 2003/0214575 A1 | 11/2003 | Yoshikawa | |
| 2004/0021767 A1 | 2/2004 | Endo et al. | |
| 2004/0051805 A1 | 3/2004 | Yoshikawa et al. | |
| 2004/0066449 A1 | 4/2004 | Givon | |
| 2004/0105025 A1 | 6/2004 | Scherling | |
| 2004/0183907 A1 | 9/2004 | Hovanky et al. | |
| 2004/0195492 A1 | 10/2004 | Hsin | |
| 2004/0246333 A1 | 12/2004 | Steuart et al. | |
| 2004/0263611 A1 | 12/2004 | Cutler | |
| 2005/0053274 A1 | 3/2005 | Mayer et al. | |
| 2005/0057659 A1 | 3/2005 | Hasegawa | |
| 2005/0081629 A1 | 4/2005 | Hoshal | |
| 2005/0111106 A1 | 5/2005 | Matsumoto et al. | |
| 2005/0185711 A1 | 8/2005 | Pfister et al. | |
| 2005/0218297 A1 | 10/2005 | Suda et al. | |
| 2005/0243175 A1 | 11/2005 | Yamada et al. | |
| 2006/0023074 A1 | 2/2006 | Cutler | |
| 2006/0023106 A1 | 2/2006 | Yee et al. | |
| 2006/0023278 A1 | 2/2006 | Nishioka | |
| 2006/0061660 A1* | 3/2006 | Brackmann | H04N 5/2253 348/208.1 |
| 2006/0098267 A1* | 5/2006 | Togawa | G02B 26/0816 359/291 |
| 2006/0140446 A1 | 6/2006 | Luo et al. | |
| 2006/0193509 A1 | 8/2006 | Criminisi et al. | |
| 2006/0215054 A1 | 9/2006 | Liang et al. | |
| 2006/0215903 A1 | 9/2006 | Nishiyama | |
| 2006/0238441 A1 | 10/2006 | Benjamin et al. | |
| 2007/0024739 A1 | 2/2007 | Konno | |
| 2007/0058961 A1 | 3/2007 | Kobayashi et al. | |
| 2007/0064142 A1 | 3/2007 | Misawa et al. | |
| 2007/0085903 A1 | 4/2007 | Zhang | |
| 2007/0146530 A1 | 6/2007 | Nose | |
| 2007/0164202 A1 | 7/2007 | Wurz et al. | |
| 2007/0216796 A1 | 9/2007 | Lenel et al. | |
| 2007/0242152 A1 | 10/2007 | Chen | |
| 2007/0263115 A1 | 11/2007 | Horidan et al. | |

(56) References Cited

U.S. PATENT DOCUMENTS

| | | |
|---|---|---|
| 2007/0268983 A1 | 11/2007 | Elam |
| 2008/0029708 A1* | 2/2008 | Olsen ................ G02B 7/04 250/372 |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0219402 A1* | 9/2009 | Schneider ............ G03B 17/00 348/208.7 |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1* | 8/2010 | Takizawa ............... G03B 5/00 396/55 |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1 | 2/2011 | Wang et al. |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0150442 A1* | 6/2011 | Ollila ..................... G03B 3/10 396/55 |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1* | 10/2011 | Minamisawa ............ G03B 5/00 396/55 |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1* | 2/2012 | Lin ................... G02B 27/646 348/208.2 |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0070055 A1 | 3/2013 | Atanassov et al. |
| 2013/0076924 A1* | 3/2013 | Wade ..................... G03B 5/02 348/208.11 |
| 2013/0077945 A1* | 3/2013 | Liu .................... G02B 26/0841 396/55 |
| 2013/0100304 A1* | 4/2013 | Wade ..................... G03B 5/00 348/208.4 |
| 2013/0128030 A1 | 5/2013 | Georgiev |
| 2013/0141802 A1 | 6/2013 | Yang |
| 2013/0182325 A1* | 7/2013 | Minamisawa ........... G03B 5/00 359/554 |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1* | 1/2014 | Topliss ................. G02B 27/646 348/208.11 |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0139693 A1* | 5/2014 | Takei ..................... G03B 5/00 348/208.11 |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1* | 2/2015 | Nakayama ........... G02B 27/646 359/557 |
| 2015/0049172 A1 | 2/2015 | Ramachandra et al. |
| 2015/0070562 A1 | 3/2015 | Nayar et al. |
| 2015/0085363 A1* | 3/2015 | Liu .................... G02B 26/0841 359/554 |
| 2015/0125092 A1 | 5/2015 | Zhuo et al. |
| 2015/0177524 A1 | 6/2015 | Webster et al. |
| 2015/0201128 A1* | 7/2015 | Dong ................. H04N 5/23287 348/208.11 |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |
| 2015/0373252 A1 | 12/2015 | Georgiev |
| 2015/0373262 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De Leon et al. |
| 2016/0085059 A1 | 3/2016 | Mercado |
| 2016/0127641 A1 | 5/2016 | Gove |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0353008 A1 | 12/2016 | Osborne |
| 2017/0026570 A1 | 1/2017 | Shepard et al. |

(56) References Cited

U.S. PATENT DOCUMENTS

| | | | |
|---|---|---|---|
| 2017/0038502 A1 | 2/2017 | Georgiev | |
| 2017/0118421 A1 | 4/2017 | Georgiev | |

FOREIGN PATENT DOCUMENTS

| | | | |
|---|---|---|---|
| CN | 101581828 A | 11/2009 | |
| CN | 101867720 A | 10/2010 | |
| CN | 101902657 A | 12/2010 | |
| CN | 202405984 U | 8/2012 | |
| EP | 0610605 A1 | 8/1994 | |
| EP | 0751416 A1 | 1/1997 | |
| EP | 1176812 A1 | 1/2002 | |
| EP | 1383342 A2 | 1/2004 | |
| EP | 1816514 A1 | 8/2007 | |
| EP | 1832912 A2 | 9/2007 | |
| EP | 2242252 A2 | 10/2010 | |
| GB | 2354390 A | 3/2001 | |
| GB | 2354391 A | 3/2001 | |
| JP | H06251127 A | 9/1994 | |
| JP | H089424 A | 1/1996 | |
| JP | H0847001 A | 2/1996 | |
| JP | H08125835 A | 5/1996 | |
| JP | 8194274 A | 7/1996 | |
| JP | H08242453 A | 9/1996 | |
| JP | H10142490 A | 5/1998 | |
| JP | 2001194114 A | 7/2001 | |
| JP | 2003304561 A | 10/2003 | |
| JP | 3791847 B1 | 6/2006 | |
| JP | 2006279538 A | 10/2006 | |
| JP | 2007147457 A | 6/2007 | |
| JP | 2007323615 A | 12/2007 | |
| JP | 2008009424 A | 1/2008 | |
| JP | 2009122842 A | 6/2009 | |
| JP | 2010041381 A | 2/2010 | |
| JP | 2010067014 A | 3/2010 | |
| JP | 2010128820 A | 6/2010 | |
| JP | 2010524279 A | 7/2010 | |
| KR | 20080071400 A | 8/2008 | |
| WO | WO-9321560 A1 | 10/1993 | |
| WO | WO-9847291 A2 | 10/1998 | |
| WO | WO-2006075528 A1 | 7/2006 | |
| WO | WO-2007129147 A1 | 11/2007 | |
| WO | WO-2008112054 A1 | 9/2008 | |
| WO | WO-2009047681 A1 | 4/2009 | |
| WO | WO-2009086330 A2 | 7/2009 | |
| WO | WO-2010019757 A1 | 2/2010 | |
| WO | WO-2012136388 A1 | 10/2012 | |
| WO | WO-2012164339 A1 | 12/2012 | |
| WO | WO-2013154433 A1 | 10/2013 | |
| WO | WO-2014012603 A1 | 1/2014 | |
| WO | WO-2014025588 A1 | 2/2014 | |

OTHER PUBLICATIONS

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, in Depth Look," IEEE Potentials, Feb./Mar. 2004, vol. 23, Issue 1, pp. 38-42.

Ricoh Imagine Change: "New Ricoh Theta Model, Capturing 360-degree Images in One Shot, is on Sale Soon—Spherical Video Function, API and SDK (Beta Version)", News Release, Oct. 28, 2014, 3 pages.

Sun W.S., et al., "Single-Lens Camera Based on a Pyramid Prism Array to Capture Four Images," Optical Review, 2013, vol. 20 (2), pp. 145-152.

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

International Search Report and Written Opinion—PCT/US2015/055519—ISA/EPO—dated Feb. 1, 2016.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Shuchun Y., et al., "Preprocessing for stereo vision based on LOG filter", Proceedings of 2011 6th International Forum on Strategic Technology, Aug. 2011, XP055211077, pp. 1074-1077.

Tan K-H., et al., "Multiview Panoramic Cameras Using a Pyramid", Omnidirectional Vision, 2002, Proceedings, Third Workshop on June 2, 2002, Piscataway, NJ, USA,IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

International Preliminary Report on Patentability—PCT/US2015/055519, The International Bureau of WIPO—Geneva, Switzerland, dated Jan. 16, 2017.

Meng et al., "Single-shot Specular Surface Reconstruction with Gonio-plenoptic Imaging," 2015 IEEE International Conference on Computer Vision; pp. 3433-3441.

Chowdhury A., et al., "Challenges of Megapixel Camera Module Assembly and Test," Electronic Components and Technology Conference, 2005, pp. 1390-1401.

* cited by examiner

OPTICAL IMAGE STABILIZATION FOR THIN CAMERAS

RELATED APPLICATIONS

This application claims the benefit of U.S. Provisional Patent Application No. 62/073,856, filed Oct. 31, 2014, and titled "ARRAY CAMERA WITH IMAGE STABILIZATION," the disclosure of which is incorporated herein by reference in its entirety.

This application is related to U.S. patent application Ser. No. 14/743,818, filed Jun. 18, 2015, and entitled "PARALLAX FREE THIN MULTI-CAMERA SYSTEM CAPABLE OF CAPTURING FULL WIDE FIELD OF VIEW IMAGES," U.S. patent application Ser. No. 14/611,045, filed Jan. 30, 2015, and entitled "MULTI-CAMERA SYSTEM USING FOLDED OPTICS FREE FROM PARRALAX ARTIFACTS," and U.S. patent application Ser. No. 11/623,050, filed on Jan. 12, 2007, entitled, "PANORAMIC IMAGING TECHNIQUES," all of which are incorporated herein by reference in their entirety.

TECHNICAL FIELD

The present disclosure relates to imaging systems and methods of optical image stabilization for use with thin imaging technology systems or other similar imaging technologies. In particular, the disclosure relates to systems and methods that enable image stabilization of low-profile imaging systems in a thin form factor, for example, mobile phones, while maintaining or improving image quality and/or resolution.

BACKGROUND

Many mobile devices, such as mobile phones and tablet computing devices, include cameras that may be operated by a user to capture still or video images. Because many of such mobile devices are often designed to be relatively small and/or thin, it can be important to design the cameras or imaging systems to be used therein to be as thin as possible in order to maintain the low-profile of the device.

One way to make a camera thin is to decrease the focal length thereof, thereby widening the field of view. Wide field of view cameras, however, may have drawbacks in some applications because the resolution of a particular object in the object space decreases as the field of view of the camera increases.

Another method for making a thin camera, that increases the effective resolution of the lens and the pixel count as compared with traditional wide field of view cameras, is to use folded optics to maintain the thin form factor by adding more cameras with narrow field of view lenses. Such a system of multiple cameras can be considered an array camera. The images from each of the individual cameras in the array camera may be merged or combined together to form a composite image.

In these systems the alignment between the individual cameras in the array camera requires tight tolerances of the physical location of components in the system. Adding Optical Image Stability (OIS) methods to an array camera system or other type of camera system may increase the difficulty of maintaining these tolerances. OIS is particularly beneficial because many camera systems experience unsteadiness or jitter during image capture. This is especially true of the thin handheld devices discussed above. The methods and systems described herein show how one may implement OIS for an array camera system or other camera system in a thin form factor that can be used in the devices previously mentioned, while still maintaining the tight positional tolerances required for some camera systems.

SUMMARY

The systems, methods and devices of this disclosure each have several innovative aspects, no single one of which is solely responsible for the desirable attributes disclosed herein.

In one aspect, an image stabilization system for a camera system includes a stabilization platform configured to support a camera system, a camera housing, a fulcrum rotationally and pivotally connecting the stabilization platform to the camera housing, the fulcrum configured such that the stabilization platform can tilt and rotate relative to the camera housing in at least one of the pitch, roll, and yaw directions, at least one gyroscope rigidly connected to the stabilization platform to move with the stabilization platform, and at least one actuator coupled to the stabilization platform and configured to cause tilting or rotation of the stabilization platform in at least one of the pitch, roll, and yaw directions.

The system may also include a processor in electronic communication with the at least one gyroscope and the actuator, the processor configured to perform operations including receiving the motion data from the at least one gyroscope, determining, based on analyzing the motion data, that the camera system is experiencing jitter, generating the motion instructions for the actuator, the motion instructions configured to compensate for one or both of a frequency and a magnitude of the jitter, and providing the motion instructions to the actuator. In some embodiments, the stabilization platform is configured so as to not substantially obstruct a field of view of the camera system. In some embodiments, the stabilization platform may be a substantially flat plate.

In another aspect, an image stabilization system for an array camera includes an array camera having a virtual optical axis, the array camera having at least two cameras, each of the at least two cameras configured to capture one of a plurality of portions of a target image of a scene, a support structure supporting the array camera, a pivot member rigidly connected to the support structure, the pivot member configured to pivot in yaw, pitch, and roll directions around a center of the pivot member, the center of the pivot member aligned with the virtual optical axis of the array camera, and an actuator coupled to the support structure, the actuator configured to receive motion instructions and to rotate the support structure in the yaw, pitch, and roll directions around the center of the pivot member in response to the received motion instructions.

The system may also include at least one gyroscope, the gyroscope configured to generate motion data, the motion data indicative of a motion of the at least one gyroscope, and a processor in electronic communication with the at least one gyroscope and the actuator, the processor configured to perform operations comprising receiving the motion data from the at least one gyroscope, determining, based on analyzing the motion data, that the array camera is experiencing jitter, generating the motion instructions for the actuator, the motion instructions configured to compensate for one or both of a frequency and a magnitude of the jitter, and providing the motion instructions to the actuator. The pivot member may be disposed on the top surface or bottom surface of the support structure. The at least one gyroscope may be positioned on a corner of the support structure. The at least one gyroscope can be positioned in a blind spot of the camera system. The at least one gyroscope may include first, second, and third gyroscopes. For example, the system may include a first gyroscope in first corner of the support structure, a second gyroscope in a second corner of the support structure, and a third gyroscope in a third corner of the support structure.

The system may also include a housing including an internal cavity, the support structure and the array camera disposed within the internal cavity, and an aperture positioned to allow light representing the target image to pass through aperture and into the internal cavity of the housing and to reach each of the at least two cameras, and wherein the actuator is further coupled to the housing and further configured to pivot the support structure in the yaw, pitch, and roll directions relative to the housing.

In some embodiments, each of the at least two cameras of the array camera include an image sensor, a lens assembly comprising at least one lens, the lens assembly having a center of projection, the lens assembly positioned to focus light on the image sensor, and a mirror positioned to reflect light to the lens assembly, the mirror further positioned on a mirror plane, the mirror plane positioned at the midpoint of and orthogonal to a line segment extending between the center of projection and the virtual center of projection. The array camera may also include a central reflective element having a plurality of primary light re-directing surfaces configured to split the light into the plurality of portions, the mirror of each of the at least two cameras forming one of the primary light re-directing surfaces. In some embodiments, each of the at least two cameras further includes a secondary light re-directing surface positioned to direct light from the lens assembly onto the image sensor, and wherein the image sensors of each of the at least two cameras are disposed on an upper surface of the plate and positioned substantially parallel with the upper surface of the plate In another aspect, a method for image stabilization of a camera system includes receiving motion data at a processor, the motion data generated by at least one gyroscope in electronic communication with the processor, analyzing the motion data with a processor to determine that a camera system is experiencing jitter, generating instructions for an actuator to compensate for one or both of a frequency and magnitude of the jitter, providing the instructions to the actuator, and moving a stabilization platform supporting the camera system with the actuator in response to the provided instructions. In some embodiments the method may include repeating the steps in a feedback loop. In some embodiments the method may also include receiving image motion data at the processor, the image motion data comprising image data generated by the camera system, and analyzing the image motion data with the processor to determine that a camera system is experiencing jitter.

In some embodiments, moving the stabilization platform includes pivoting the stabilization platform in pitch, yaw, and roll directions around a center point of a fulcrum rigidly attached to the stabilization platform, the center point aligned with an optical axis of the camera system. In some embodiments, the actuator includes a first linear actuator configured to pivot the stabilization platform in the pitch direction, a second linear actuator configured to pivot the stabilization platform in the yaw direction, and a third linear actuator configured to pivot the stabilization platform in the roll direction.

BRIEF DESCRIPTION OF THE DRAWINGS

The disclosed aspects will hereinafter be described in conjunction with the appended drawings which are provided to illustrate and not to limit the disclosed aspects, and wherein like designations denote like elements.

DETAILED DESCRIPTION

Implementations disclosed herein provide systems, methods, and apparatus for stabilizing images captured using camera systems. In the following description, specific details are given to provide a thorough understanding of the examples. However, the examples may be practiced without these specific details.

Many devices include camera systems for capturing still and/or video images, for example, cell phones, personal tablets, or digital cameras. A user capturing an image with one of these devices will generally hold the device and aim it towards the target image. The user holding the device, however, may not be able to completely stabilize the camera system during image capture. Accordingly, the images or video may exhibit poor quality due to the unsteadiness of the user. This unsteadiness is referred to herein as jitter and includes motion of the device (including the camera system) that has a high temporal frequency relative to the integration/exposure time of a captured image. Jitter may be differentiated from other types of motion having a lower frequency relative to the integration time and/or a relatively constant rate during the integration/exposure time. In some instances, jitter can include a relatively sinusoidal motion during the integration/exposure time. It is noted that jitter may also be caused by factors other than unsteadiness of a user's hand. For example, a camera mounted to a moving structure, for example, a car or bike, may exhibit jitter due to the motion of the structure. The systems and methods disclosed herein may be used to decrease the effects of jitter on the captured image regardless of the source of the jitter.

Figure 1:
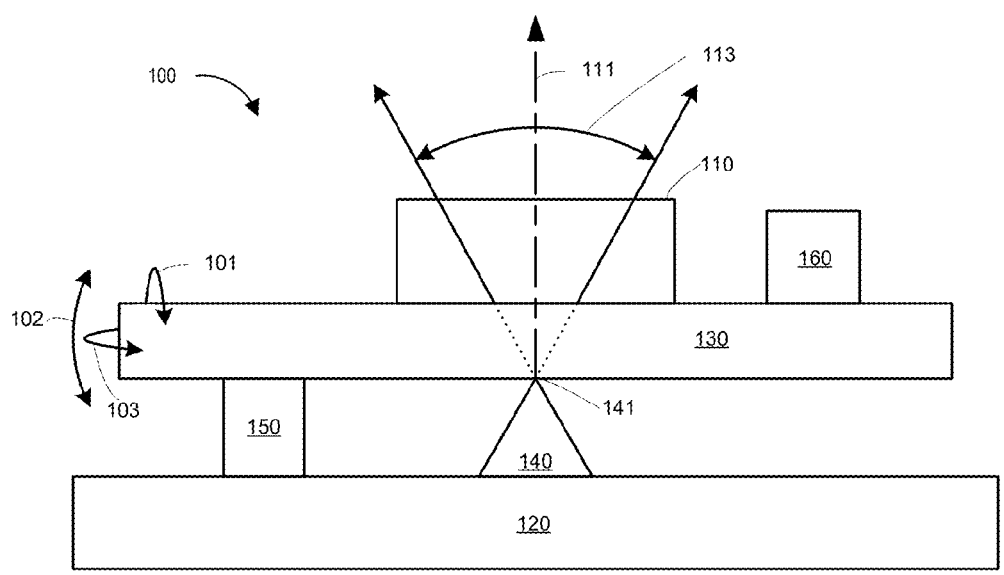
FIG. 1 illustrates an example of a simplified view of an implementation of an image stabilization system configured for rotating a camera system about a fulcrum in yaw, pitch, and roll directions.

FIG. 1 shows a simplified view of an implementation of an image stabilization system 100 for stabilizing a camera system 110 by rotating and/or tilting the camera system 110 about a fulcrum 140 in pitch, roll, and yaw directions. The image stabilization system 100 may be used to stabilize the camera system 110 by moving the camera system 110 to counteract or compensate for jitter experienced during image capture. In the simplified implementation shown, the image stabilization system 100 includes a camera housing 120, a stabilization platform 130, a fulcrum 140, an actuator 150 and a gyroscope 160. A person of ordinary skill in the art will understand that these components, represented only schematically in FIG. 1, may be duplicated, omitted, and/or modified according to the principles described herein to practice the image stabilization system 100 in variety of circumstances.

The image stabilization system 100 is configured to support and stabilize a camera system 110. In FIG. 1, the camera system 110 can be any type of image capture system, including film or digital cameras, including single or multiple lenses, sensors, or other elements. In particular, the image stabilization system 100 may be beneficial for use in thin camera systems, such as wide field of view cameras, folded optics camera systems, or array camera systems; camera systems that require tight positional tolerances between their components, such as parallax free folded optics camera systems or array camera systems; or any other type of imaging system designed for high resolution performance. While explaining the methods and systems for image stabilization presented herein it is important to cover the parallax free category of array cameras because of the especially high requirement for tight tolerances in those systems. Additional general information and specific implementations of parallax free array cameras are described in U.S. patent application Ser. No. 14/743,818, filed Jun. 18, 2015, and entitled "PARALLAX FREE THIN MULTI-CAMERA SYSTEM CAPABLE OF CAPTURING FULL WIDE FIELD OF VIEW IMAGES," and U.S. patent application Ser. No. 14/611,045, filed Jan. 30, 2015, and entitled "MULTI-CAMERA SYSTEM USING FOLDED OPTICS FREE FROM PARRALAX ARTIFACTS," both of which are incorporated herein by reference in their entirety. Specific examples of optical image stabilization systems configured for use with these types of cameras will be described in greater detail below.

The image stabilization system 100 includes a stabilization platform 130 configured to support the camera system 110. The stabilization platform 130 serves as a stable and secure base onto which the camera system 110 can be installed. In some implementations, the camera system 110 comprises a single assembly which is attached to the stabilization platform 130, while in other implementations, the camera system 110 includes separate individual components (for example, lenses, sensors, light folding surfaces, etc.) that are individually attached to the stabilization platform in a specified arrangement.

While the term platform is used to describe the stabilization platform 130, this is not intended to be limiting of the shape of the stabilization platform 130. For example, the stabilization platform 130 may be a substantially flat, square, or circular plate, configured to support the camera system 110 in a fixed orientation. In some implementations, however, the stabilization platform 130 need not include a uniformly planar surface. That is, the stabilization platform 130 may be configured to support different components of the camera system 110 in different planes. The stabilization platform 130 may be formed with a unitary construction or a multi-piece construction. In implementations of the stabilization platform 130 made from a multi-piece construction, the multiple pieces may be rigidly affixed to each other so that the entirety of the stabilization platform 130 moves as a single piece. The stabilization may also be formed as a frame of interconnected members for supporting the camera system 110. This may be beneficial for minimizing the weight of the stabilization platform 130 while maintaining strength and rigidity. In some implementations, the stabilization platform 130 is configured to be substantially thin in a direction parallel to the optical axis 111 of the camera system 110, although this need not always be the case. A stabilization platform 130 that is thin may be beneficial in applications where the camera system 110 and image stabilization system 100 are incorporated into a thin portable device, like a cell phone or tablet computer.

As described above, the camera system 110 or each of the components thereof, is rigidly attached to the stabilization platform 130 such that the positioning of each of the components relative to each of the other components does not change as the stabilization platform 130 rotates and/or tilts. That is, the camera system 110 or the individual components thereof, when attached to the stabilization platform 130 experience the same rotation and/or tilt as experienced by the stabilization platform 130. Accordingly, for multi-component camera systems, for example, a parallax free array camera system, movement of the camera system 110, by tilting or rotating the stabilization platform 130, will not affect the parallax-free configuration of the array camera. The stabilization platform 130 supports that camera system 110 so that any required positional tolerances between individual components of the camera system 110 remain fixed during motion of the stabilization platform 130 and the camera system 110.

In some implementations, the camera system 110 is attached to the stabilization platform so that the optical axis 111 and field of view (FOV) 113 of the camera system 110 point generally away from the surface of the stabilization platform 130 onto which the camera system 110 is attached.

The stabilization platform 130 may be pivotally attached to a camera housing 120 via a fulcrum 140 such that the stabilization platform 130 may be moved through a range of motion relative to the camera housing 120 in each of the pitch 101, roll 102, and yaw 103 directions. As used herein, the terms pitch, roll, and yaw are used to define the motion of the stabilization platform 130 (and the camera system 110 attached thereto) relative to the camera housing 120. For example, pitch 101 defines an angle of tilt of the stabilization platform 130 in a first plane; roll 102 defines an angle of tilt of the stabilization platform 130 in a second plane orthogonal to the first plane; and roll 102 measures the angular rotation of the stabilization platform 130 relative to the camera housing 120. These definitions of pitch, roll, and yaw are merely provided by way of example and are not intended to be limiting. Movement of the camera system 110 and stabilization platform 130 in the pitch, roll, and yaw, directions signifies that the stabilization platform 130 is free to tilt and/or rotate in any direction to adjust the gaze of the camera system 110. It will be understood by a person of ordinary skill in the art that the image stabilization system 100 allows for free tilting and/or rotation of the stabilization platform 130 in all directions, limited only by the mechanical or physical constraints of the system. In some implementations, the stabilization platform 130 can be configured to tilt or rotate at least 15° in each of the pitch, roll, and yaw directions. In some implementations, the stabilization platform 130 can be configured to tilt or rotate at least 5° in each of the pitch, roll, and yaw directions. In some implementations, the stabilization platform 130 can be configured to tilt or rotate at least 2° in each of the pitch, roll, and yaw directions The stabilization platform 130 may be configured to allow relative motion between the stabilization platform 130 (and the camera system 110) and the camera housing 120 in order to compensate or correct for jitter experienced during image capture. For example, if jitter causes the optical axis 111 of the camera system 110 to be tilted up, the stabilization platform 130 can be rotated down to correct for the upward tilt. Similarly, if jitter causes the camera system 110 to be rotated about its optical axis 111, the stabilization platform 130 can be counter-rotated to counteract the jitter. An example process for detecting and counteracting jitter will be described below in reference to FIG. 6.

The motion of the stabilization platform 130 relative to the camera housing 120 may be accomplished with a fulcrum 140. In simplest terms, the fulcrum 140 provides a fulcrum point 141 around which the stabilization platform 130 may tilt or rotate. A person of ordinary skill in the art will appreciate that several different structures may be used as the fulcrum 140. For example, as illustrated in FIG. 1, the fulcrum 140 may be pointed structure attached at its base to the camera housing 120, and the stabilization platform 130 may tilt or rotate around the fulcrum point 141 located at the top of the pointed structure. This structure may also be reversed, with the base of the fulcrum 140 attached to the stabilization platform 130 and the fulcrum point 141 resting on camera housing 120. It can thus be seen that by adjusting the size, shape, and attachment of the fulcrum 140, the location of the fulcrum point 141 can be varied. It should be noted that the fulcrum point 141 may be received into a corresponding structure to maintain alignment. For example, in the implementation shown in FIG. 1, the stabilization platform 130 may include a recess or indentation configured to receive the fulcrum point 141. This may allow the stabilization platform 130 to remain centered on the fulcrum point 141.

In another implementation, the fulcrum 140 may be a ball bearing positioned between the stabilization platform 130 and the camera housing 120. It will be appreciated that the fulcrum point of a ball bearing is the center of the ball. In implementations using a ball bearing, one or both of the stabilization platform 130 or camera housing 120 may include a recess configured to receive the ball bearing. In some implementations, the fulcrum 140 may be a multi-directional joint attached to both the stabilization platform 130 and camera housing 120. In other implementations, the fulcrum 140 may not include a physical structure. For example, the stabilization platform 130 can be attached to the camera housing 120 or by a plurality of actuators 150, and the actuators 150 may be configured to cause the stabilization platform to pivot around a fulcrum point 141 in space, even though the fulcrum point 141 does not include any physical structure.

In some implementations, the fulcrum point 141 is aligned with the optical axis 111 of the camera system 110. This positioning allows the camera system 110 to be rotated around its optical axis 111 for image stabilization. In some implementations, the fulcrum point 141 may also be aligned to coincide with the center of projection or pupil of the camera system 110. Although, in some implementations, alignment of the optical axis 111 and/or pupil of the camera system 110 and the fulcrum point 141 is not required.

The image stabilization system 100 may also include one or more gyroscopes 160. The one or more gyroscopes 160 can be mechanical gyroscopes, electronic, microchip-packaged micro-electronic mechanical system (MEMS) gyroscope devices, solid-state ring lasers, fiber optic gyroscopes, or extremely sensitive quantum gyroscopes. Gyroscopes 160 may be disposed on the stabilization platform 130 to measure the orientation and movement of the stabilization platform 130 and the camera system 110 mounted thereon. In some implementations, additional gyroscopes 160 may be mounted directly to the camera housing 120 and configured to measure the orientation and movement thereof. As will be discussed in greater detail below, the gyroscopes 160 may be configured to generate motion data, which can be analyzed to detect and create instructions for correcting jitter.

The image stabilization system 100 may also include one or more actuators 150. In some implementations the one or more actuators 150 may be coupled between the stabilization platform 130 and the camera housing 120. The actuators 150 are configured to control rotation and/or tilting of the stabilization platform 130 and the camera system 110. In some implementations, three actuators 150 are used, with each actuator 150 configured to control one of the pitch, roll, and yaw of the stabilization platform 130.

In some implementations, the actuators 150 act directly on the stabilization platform 130. For example, a first actuator 150 can be a linear actuator disposed between the stabilization platform 130 and the camera housing 120, and a second actuator 150 can be a linear actuator also disposed between the stabilization platform 130 and the camera housing 120. The first and second actuators 150 can be positioned so that a first line extending between the first actuator and the fulcrum 140 is orthogonal to a second line extending between the second actuator and the fulcrum 140. Accordingly, the first actuator 150 can control tilt in the pitch direction and the second actuator 150 can control tilt in the yaw direction. A third actuator 150 can also be a linear actuator disposed between the stabilization platform 130 and the camera housing 120. The third actuator 150 can be located along a radius perpendicular to the optical axis 111 and aligned in such a way it can cause the camera system to rotate about its optical axis 111. Accordingly, the third actuator 150 can control rotation of the stabilization platform 130 in the roll direction.

In some implementations, the actuators 150 may act on the fulcrum 140, rather than directly on the stabilization platform 130. For example, in some implementations, the fulcrum 140 may be a ball bearing, and each of three actuators 150 may be a roller pressed against the surface of the ball bearing. In some configurations, the two actuators controlling the pitch and yaw rotations may be oriented such that the axis of rotation of each of the two rotation rollers is generally pointing in a direction orthogonal to the other's axis of rotation, and each axis of rotation may be located in a separate planes that is parallel with that of the other, where these separate planes are generally orthogonal to the optical axis 111 of the camera system. The third rotation actuator may have its axis of rotation pointing generally in the direction of the optical axis 111. Other arrangements of the three rotation actuators may be used such that rotation of axis for each the rotation actuators may point generally in different directions to each other and arranged such that it may be possible to effectively rotate the camera system 110 or the stabilization platform 130 in such a way the optical axis of the camera system 110 may be tilted in the pitch and yaw directions and the optical axis 111 of the camera system 110 generally rotated in the roll rotation direction. Accordingly, the movement of the camera system 110 can be effected by controlling the rotation of the roller actuators to allow movement in the pitch, yaw, and roll directions. In some implementations one or more rotation devices may be pressed against the surface of the ball bearing in such an arrangement where each roller axis of rotation may be rotated along an axis orthogonal to the rollers axis of rotation in such away so as to be able to rotation the optical axis 111 in the pitch, yaw and rotation directions.

In some implementations, one or more of the actuators 150 may act on the camera housing 120. For example, a linear actuator 150 may act on the camera housing 120 to cause the camera housing 120, the stabilization platform 130, and the camera system 110 to rotate together around an axis of the camera housing 120. This configuration may be beneficial when one or more actuators 150, extending between the camera housing 120 and the stabilization platform 130 limit the stabilization platform's ability to rotate relative to the camera housing 120.

In some implementations, greater or fewer than three actuators 150 may be used. In some implementations, some actuators may act directly on the stabilization platform 130, and others may simultaneously act on the fulcrum 140.

In some implementations, the gyroscopes 160 and actuators 150 are positioned within blind spots of the camera system 110. In some implementations, some of the gyroscopes 160 and actuators 150 are positioned within the FOV 113 of the camera system 110, and the gyroscopes 160 and actuators 150 may be cropped out or digitally removed from the captured image.

As will be discussed in greater detail, the image stabilization system 100, including the camera system 110, gyroscopes 160, and actuators 150, may be electrically connected to an image processing module. The image processing module may include an image processor configured with instructions to perform various processing operations on the received image data and positioning data.

Figure 2:
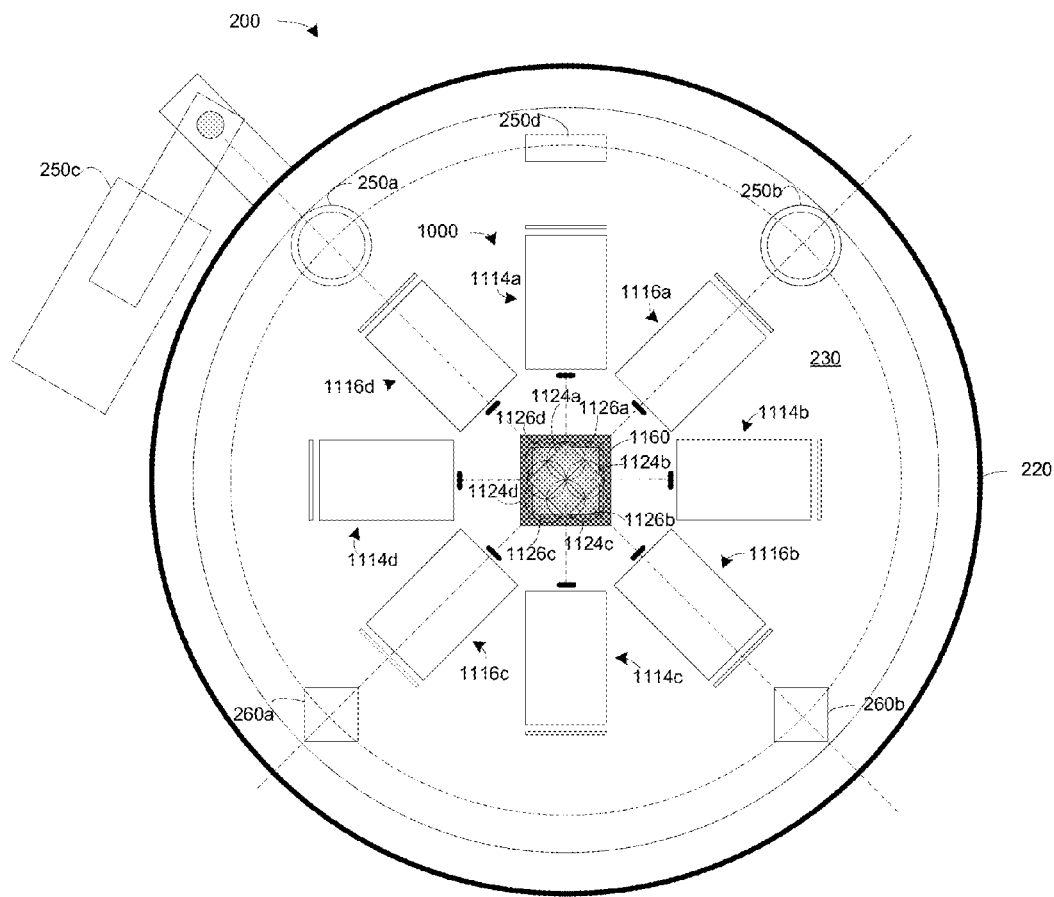
FIGS. 2 and 3 show top and side views, respectively, of an example of an implementation of an image stabilization system configured for use with a camera array system.
Figure 3:
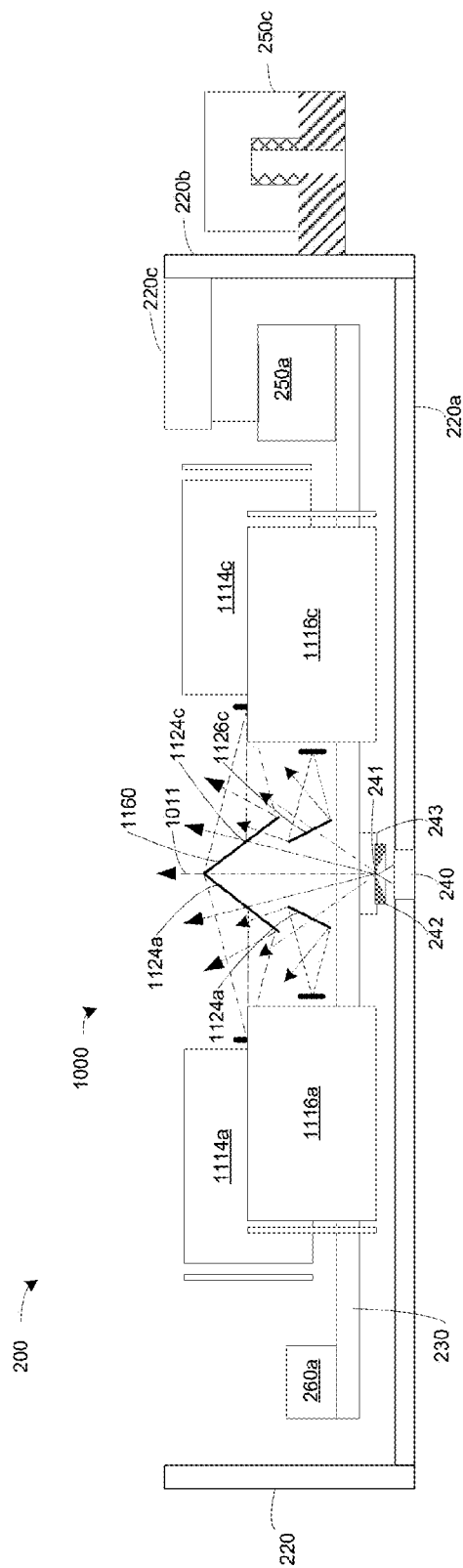

An Example of an Image Stabilization System for an Eight-Camera, Parallax-Free Array Camera System FIGS. 2 and 3 illustrate top and side views, respectively, of an example of an implementation of an image stabilization system 200 configured for use with an eight-camera, parallax-free array camera system 1000. Implementations of an eight-camera, parallax-free array camera system are described in detail in U.S. patent application Ser. No. 14/743,818, entitled "PARALLAX FREE THIN MULTI-CAMERA SYSTEM CAPABLE OF CAPTURING FULL WIDE FIELD OF VIEW IMAGES," previously incorporated herein by reference.

Referring to FIG. 2, the array camera system 1000 includes a first set (or ring) of cameras 1114a-d ("first cameras") and a second set (or ring) of cameras 1116a-d ("second cameras) that are used together to create a virtual wide field of view camera. In this example the first cameras 1114a-d includes four cameras and the second cameras 1116a-d includes four cameras. FIG. 3 shows only two cameras from each of the first cameras 1114a-d and second cameras 1116a-d for purposes of clarity. The array camera system 1000 includes four light reflective components 1124a-d (collectively referred to as "first mirrors 1124a-d" for ease of reference, although in some embodiments the reflective component may be a reflective surface other than a mirror) that redirect light to the first cameras 1114a-d, each one of the first mirrors 1124a-d corresponding to one of the first cameras 1114a-d and redirects light to its corresponding one of the first cameras 1114a-d. Further, the array camera system 1000 includes for light redirecting reflective components 1126a-d (collectively referred to as "second mirrors 1126a-d" for ease of reference, although in some embodiments the reflective component may be a reflective surface other than a mirror) that redirect light to the second cameras 1116a-d, each one of the second mirrors 1126a-d corresponding to one of the second cameras 1116a-d. For example, the first mirror 1124a corresponds to the first camera 1114a, and the second mirror 1126a corresponds to the second camera 1116a. The first mirrors 1124a-d and second mirrors 1126a-d reflect incoming light towards the entrance pupils of each of the corresponding first cameras 1114a-d and second cameras 1116a-d. For purposes of clarity, only two of the mirrors from each set of first and second cameras are shown in FIG. 3. The light received by the first cameras 1114a-d and the second cameras 1116a-d can generate a plurality of images covering a wide field of view scene, and the plurality of images can be used to form a single "mosaicked" image. Although described in terms of mirrors, the light redirecting reflective mirror components may reflect, refract, or redirect light in any manner that causes the cameras to receive the incoming light. In the implementation shown, first mirrors 1124a-d and second mirrors 1126a-d form a central light reflecting structure 1160.

First mirrors 1124a-d and second mirrors 1126a-d reflect light along the optical axes of each of the first cameras 1114a-d and the second cameras 1116a-d such that each of the corresponding first and second cameras 1114a-d and 1116a-d capture a partial image comprising a portion of the target image according to each camera's field of view. The fields of view for each camera may share overlapping regions. The captured portions of the target image for each of first and second cameras 1114a-d and 1116a-d may share the same or similar content (e.g., reflected light) with respect to the overlapping regions. Because the overlapping regions share the same or similar content, this content can be used by an image stitching module to output a composite target image.

In order to output a single target image, an image stitching module may configure an image processor to combine the multiple partial images to produce a high-resolution target image. Target image generation may occur through known image stitching techniques. Examples of image stitching can be found in U.S. patent application Ser. No. 11/623,050, filed on Jan. 12, 2007, entitled, "PANORAMIC IMAGING TECHNIQUES," which is incorporated herein by reference.

The array camera system 1000 can further be configured, by carefully positioning each of first cameras 1114a-d and second cameras 1116a-d and first mirrors 1124a-d and second mirrors 1126a-d to generate a composite image that is substantially free from parallax artifacts. This can be accomplished by positioning each of first cameras 1114a-d and second cameras 1116a-d, and first mirrors 1124a-d and second mirrors 1126a-d so as to have a single virtual field of view from a common perspective. The single virtual field of view appears as if each of the first cameras 1114a-d and second cameras 1116a-d were capturing the scene from a single point of origin (sometimes referred to herein as a virtual center of projection) despite the actual physical locations of the first cameras 1114a-d and second cameras 1116a-d being located at various points away from the single point of origin. In general, in a parallax free array camera, each individual camera of the array appears to capture its portion of the target image as if the individual camera were positioned at the virtual center of projection. The parallax free array camera can also be described as having a virtual optical axis extending from its virtual center of projection. The virtual center of projection represents the pupil location of the virtual camera formed by the array and the virtual optical axis represents the optical axis of the virtual camera and extends from the virtual center of projection into the array camera's field of view. Further details regarding positioning the cameras and aligning their respective optical axes to have a single virtual field of view and create a substantially parallax free design are described in U.S. patent application Ser. No. 14/743,818. It is sufficient for purposes of this application to understand that positional error tolerances between the various first cameras 1114a-d and second cameras 1116a-d and first mirrors 1124a-d and second mirrors 1126a-d must be small to produce a composite image free from parallax artifacts.

Herein, when the terms parallax free, free of parallax artifacts, effectively or substantially parallax free or effectively or substantially free of parallax artifacts is used, it is to be understood that the physical realities may make it difficult or nearly impossible to keep physical items in the same location over time or even have the property of being exactly the same as designed without using tolerances. The realities are things may change in shape, size, position, relative position to possible other objects across time and or environmental conditions. As such, it is difficult to talk about an item or thing as being ideal or non-changing without assuming or providing tolerance requirements. Herein, the terms such as effectively parallax free shall mean and be taken to mean the realities are most physical items will require having tolerances to where the intended purpose of the assembly or item is being fulfilled even though things are not ideal and may change over time. The terms of parallax free, free of parallax artifacts, effectively parallax free or effectively free of parallax artifacts with or without related wording should be taken to mean that it is possible to show tolerances requirements can be determined such that the intended requirements or purpose for the system, systems or item are being fulfilled.

Understanding the tight tolerance requirements associated with the array camera system 1000, or other similar folded optics or array camera designs including greater or fewer than eight individual cameras that may or may not be configured to be free from parallax artifacts, some of the benefits of the image stabilizing systems and techniques described herein become apparent. For one, because all of the individual components (in other words, the first and second cameras 1114a-d and 1116a-d and the first and second mirrors 1124a-d and 1126a-d) are all rigidly attached to the stabilization platform 230, the components all move together and the tolerances between the components are not affected. This contrasts with other image stabilization techniques which may involve moving a particular sensor, lens, or light redirecting surface separately to stabilize an image. Second, because the array camera system 1000 uses the first mirrors 1124a-d and the second mirrors 1126a-d to fold light towards the first and second cameras 1114a-d and 1116a-d, the array camera system 1000 is relatively thin and suitable for use in thin devices, like cell phones or tablets. The image stabilization systems described herein may also be designed to be relatively thin and thus are suitable for use in similar applications.

Returning to FIGS. 2 and 3, the image stabilization system 200 for use with the array camera system 1000 is now described in greater detail. As shown, each of the components of the array camera system 1000 (for example, the first and second cameras 1114a-d and 1116a-d and their corresponding first and second mirrors 1124a-d and 1126a-d) may all be rigidly attached to the stabilization platform 230. The arrangement of the components of the array camera system 1000 is fixed relative to each other so that the tight tolerances required for the arrangement and alignment of said components of the array camera system 1000 are maintained, even though motion of the image stabilization system 200. As seen in FIG. 2, the illustrated stabilization platform 230 is substantially circular in shape, although other shapes are possible. As shown in FIG. 3, the various components of the array camera system 1000 may be mounted at different heights relative to the stabilization platform 230. For example, first cameras 1114a and 1114c may be mounted above the surface of the stabilization platform 230, while second cameras 1116a and 1116c may have at least some of their structure mounted at least partially below the surface of the stabilization platform 230. In some implementations, this is accomplished by installing the components of the array camera system 1000 on risers installed onto, or recesses or holes formed in, the stabilization platform 230. In some implementations, the stabilization platform 230 may be formed of a shape specifically designed to secure the components of the array camera system 1000 in the correct positions, including features configured to provide the correct heights for each of the components.

The stabilization platform 230 may be pivotally and/or rotationally coupled to the camera housing 220 via a fulcrum 240. The fulcrum 240 is configured to allow the stabilization platform 230 to tilt and/or pivot freely in each of the pitch, roll, and yaw, directions relative to the camera housing 220. The fulcrum 240 may include a pointed structure attached to the camera housing 220 that is received into a corresponding recess 242 attached to the stabilization platform 230. The fulcrum 240 may include a fulcrum point 241 around which the stabilization platform 230 tilts and/or rotates.

In some implementations, the fulcrum point 241 is positioned to coincide with the virtual center of projection of the array camera system 1000. The stabilization platform 230 may include one or more spacers 243 configured to correctly position the stabilization platform 230 so that it rotates or tilts around the virtual center of projection of the array camera system 1000.

One or more gyroscopes 260a, 260b may be attached to the stabilization platform 230. The gyroscopes 260a, 260b may be configured to provide positional and/or movement data about the stabilization platform 230. This data may be analyzed to determine whether the stabilization platform 230 (and array camera system 1000 attached thereto) is experiencing jitter and to create actuator instructions that compensate or counteract the detected jitter.

The image stabilization system 200 may include one or more actuators 250a, 250b, 250c, 250d configured to tilt or rotate the stabilization platform 230. Some of the actuators may be linear actuators configured to extend between the camera housing 220 and the stabilization platform 230 to control the tilt of the stabilization platform, for example, actuators 250a, 250b. As best seen in FIG. 3, actuator 250a extends between an upper surface 220c of the camera housing 220 and the stabilization platform 230. However, the actuators may also be positioned between a lower surface 220a or a side surface 220b of the camera housing 220 and the stabilization platform 230. The actuator 250c is a linear actuator configured to act on an arm extending from the camera housing 220. Therefore, the actuator 250c can be used to rotate the entirety of the camera housing 220, thereby rotating the stabilization platform 230 and the array camera system 1000. The actuator 250d is a linear actuator configured to rotate the stabilization platform 230 relative to the camera housing 220. In various implementations, some of these actuators may be omitted.

The image stabilization system 200 may be connected to a processor configured to analyze motion data from the gyroscopes 260a, 260b and create actuator instructions to stabilize the stabilization platform and correct or compensate for detected jitter.

Figure 4:
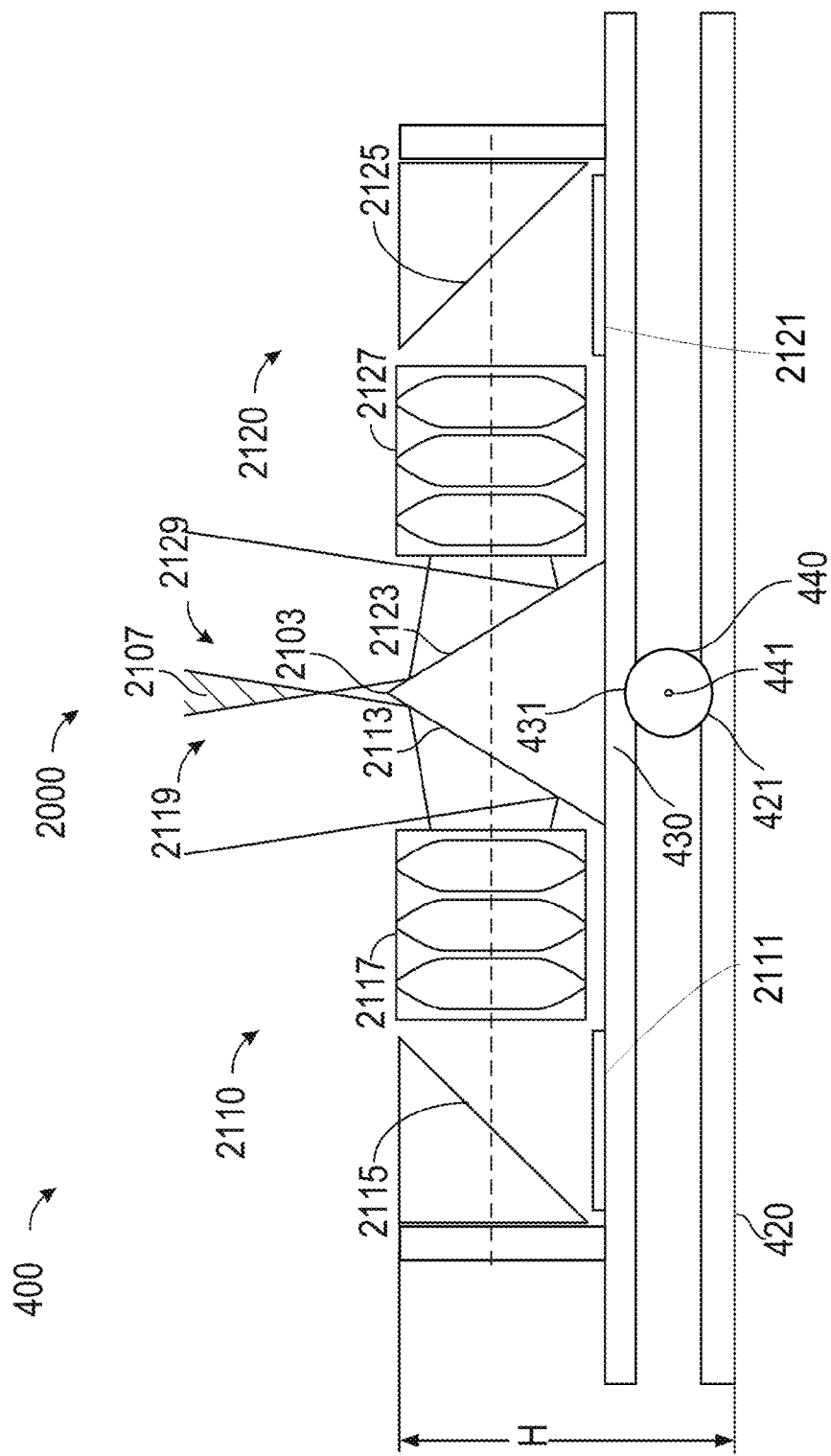
FIG. 4 shows an example of another implementation of an image stabilization system configured for use with a folded optics array camera, wherein the image sensors are positioned to be parallel with the stabilization platform.

FIG. 4 illustrates another example of an implementation of an image stabilization system 400 configured for use with a folded optic array camera 2000, wherein the sensors 2111, 2121 are positioned so as to be parallel with the stabilization platform 430. As used herein, the term "folded" is meant in a broad sense that is used to characterize a type of imaging system where light entering the imaging system is re-directed at least once before ultimately illuminating a sensor in the imaging system. In other words, light that is propagating in one direction as it enters an imaging system is re-directed, or "folded," at least once to propagate in a different direction before it is incident on a sensor.

The folded optic array camera 2000 includes a first camera 2110 and a second camera 2120. Each of the first camera 2110 and the second camera 2120 includes an image sensor, lens system, and a number of corresponding light folding surfaces. For example, the first camera 2110 includes the sensor 2111, a primary light folding surface 2113, a secondary light folding surface 2115, and a lens assembly 2117. The first camera 2110 is arranged to produce a field of view (FOV) 2119 as shown. Similarly, the second camera 2120 includes the image sensor 2121, a primary light folding surface 2123, a secondary light folding surface 2125, and a lens assembly 2127. The second camera 2120 is arranged to produce a FOV 2129 as shown. The folded optic array camera 2000 has a total FOV that includes the FOVs 2119, 2129 of the first and second cameras 2110, 2120, respectively. In some implementations, the FOV of the folded optic array camera 2000 may include an overlap 2107 between the FOVs 2119, 2129 of the first and second cameras 2110, 2120.

The sensors 2111, 2121 may each comprise, in certain implementations, a charge-coupled device (CCD), complementary metal oxide semiconductor sensor (for example, a Complementary metal-oxide semiconductor (CMOS)), or any other image sensing device that receives light and generates image data in response to the received image. The sensors 2111, 2121 may be configured to generate image data of a single image and/or may be configured to generate image data of a plurality of images (for example, capture video data or a series of single images). The sensors 2111, 2121 may be an individual sensor, or each may represent an array of sensors, for example, a 3×1 array of sensors. As will be understood by one skilled in the art, any suitable sensor or array of sensors may be used in the disclosed implementations.

In some implementations, the components of the folded optic array camera 2000 are disposed a stabilization platform 430. For example, a central reflective prism 2103 may be disposed on the stabilization platform 430. The central reflective prism 2103 may include the primary light folding surfaces 2113, 2123 for each of first and second cameras 2110, 2120. In some implementations, the central reflective prism 2103 is configured to redirect light representing the target image entering the folded optic array camera 2000 from a substantially vertical direction into a substantially horizontal direction, the horizontal direction substantially parallel with the stabilization platform 430.

The lens assemblies 2117, 2127 are also disposed on the stabilization platform 430 and positioned so that light reflecting off the primary light folding surfaces 2113, 2123 of the central reflective prism 2103 passes through the lens assemblies. One or more lens assemblies 2117, 2127 may be provided between the central reflective prism 2103 and the sensors 2111, 2121. The lens assemblies 2117, 2127 may be used to focus the portion of the target image which is directed toward each sensor 2111, 2121.

In some implementations, each lens assembly comprises one or more lenses and an actuator for moving the lens among a plurality of different lens positions through a housing. The actuator may, for example, be a voice coil motor (VCM), micro-electronic mechanical system (MEMS), or a shape memory alloy (SMA). The lens assembly may further comprise a lens driver for controlling the actuator. In some implementations, traditional auto focus techniques may be implemented by changing the focal length between the lens assembly 2117, 2127 and the corresponding sensor 2111, 2121 of each camera. In some implementations, this may be accomplished by moving a lens barrel.

The secondary light folding surfaces 2115, 2125 are mounted to stabilization platform 430 and positioned so as to redirect light coming from the lens assemblies 2117, 2127 onto the sensors 2111, 2121 which are also mounted on the stabilization platform 430. The secondary light folding surfaces 2115, 2125 may allow the sensors 2111, 2121 to be mounted on the stabilization platform 430 and oriented so as to be substantially parallel to the surface of the stabilization platform 430. In other implementations, the secondary light folding surfaces 2114, 2125 may be omitted and sensors 2111, 2121 may be oriented so as to directly receive the light exiting the lens assemblies 2117, 2127.

In some implementations, the folded optic array camera 2000 may include additional features. For example, in some implementations each sensor's 2111, 2121 FOV 2119, 2129 may be steered into the object space by the primary light folding surface 2113, 2125 of the central reflective prism 2103 associated with that sensor. Mechanical methods may be employed to tilt the mirrors and/or move the prisms in the folded optic array camera 2000 so that the FOV of each of the first and second cameras 2110, 2120 can be steered to different locations on the object field. This may be used, for example, to implement a high dynamic range camera, to increase the resolution of the camera system, or to implement a plenoptic camera system. In some implementations, the primary and secondary surfaces 2113, 2123, 2115, 2125 may include reflective and/or refractive elements. For example, in some implementations the primary light folding surface may be reflective while the secondary light folding service is refractive, and vice-versa.

Some implementations of array cameras including folded optic configurations are disclosed in U.S. Application Pub. No. 2014/0111650, filed Mar. 15, 2013, and titled "MULTI-CAMERA SYSTEM USING FOLDED OPTICS," the disclosure of which is hereby incorporated by reference.

As further seen in FIG. 4, the image stabilization system 400 also includes a fulcrum, configured as ball bearing 440 disposed between the stabilization platform 430 and the camera housing 420. The ball bearing 440 allows the stabilization platform 430 (and the folded optic array camera 2000 attached thereto) to tilt and/or rotate relative to the camera housing 420. This allows the image stabilization system 400 to implement the images stabilization techniques described herein to compensate for jitter experienced during image capture. Notably, the stabilization platform 430 tilts or rotates around the center point 441 of the ball bearing 440. Further, one or both of the stabilization platform 430 and camera housing 420 may include recessed portions 431, 421, respectively, that are configured in size and shape to receive a portion of ball bearing 440. The recessed portions 431, 421 may secure the ball bearing in place. The image stabilization system 400 may also include actuators and gyroscopes (not shown in FIG. 4).

As illustrated shown in FIG. 4, the folded optic array camera 2000 and image stabilization system 400 has a total height H. In some implementations, the total height H can be approximately 6.0 mm or less. In other implementations, the total height H can be approximately 4.0 mm or less. Though not illustrated in FIG. 4, the entirety of the folded optic array camera 2000 and the image stabilization system 400 may be provided in a device housing having a corresponding interior height of approximately 6.0 mm or less or approximately 4.0 mm or less.

Figure 5:
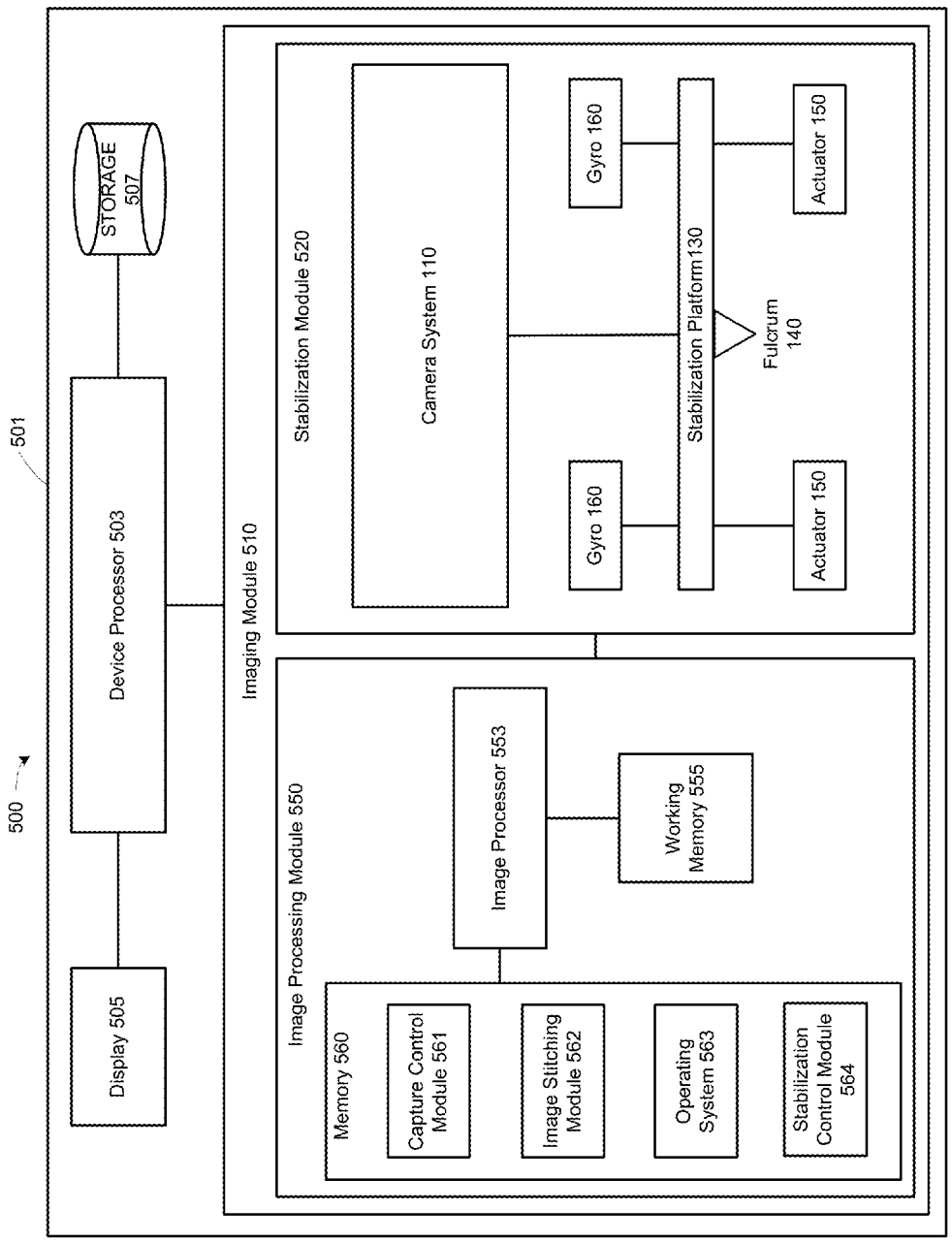
FIG. 5 is a block diagram illustrating an example of an implementation of a device including a camera system and implementing the image stabilization methods and systems.

FIG. 5 is a block diagram of one implementation of a device 500 including a camera system 110 and image stabilization components, such as those described above in reference to FIG. 1 and image stabilization system 100. Device 500 includes a device processor 503, display 505, storage 507, and an imaging module 510 disposed within a housing 501. One of skill in the art will appreciate that the implementation represented in FIG. 5 is merely provided for example only, and that other components, modules, and the arrangement thereof are possible and within the scope of this disclosure. Further, device 500 may include additional components or modules that are not shown in FIG. 5. For example, device 500 may include one or more input buttons or switches, or internal components or modules, such as batteries.

In general, device 500 may be a cell phone, digital camera, tablet computer, personal digital assistant, laptop or the like. In general, the camera system 110 can be any type of imaging system, especially any type of thin imaging system. The image stabilization methods as described herein may advantageously be deployed in any device 500 in which a reduced thickness and stable imaging system is desirable.

A plurality of applications may be available to the user on device 500. These applications may include traditional photographic and/or video applications, high dynamic range imaging, panoramic photo and video applications, and/or stereoscopic imaging applications such as those configured to capture 3D images or 3D video.

Device 500 includes an imaging module 510 which is configured to capture, process, and store images. Additionally, imaging module 510 can be configured to implement image stabilization techniques as will be described more fully below. In some implementations, imaging module 510 is manufactured separately from device 500 and configured with standard I/O interfaces so as to be easily usable within a plurality of different devices. In other implementations, imaging module 510 may be manufactured as an integral part of device 500. For example, imaging module 510 may form a part of a motherboard of device 500.

In some implementations, imaging module 510 may include one or more submodules. For example, in the implementation of FIG. 5, imaging module 510 includes a stabilization module 520 and an image processing module 550. Stabilization module 520 includes mechanical components for stabilizing the camera system 110 and image processing module 550 includes electronic components for controlling the mechanical stabilization components and for processing the captured image. Each of these modules will now be described in greater detail, beginning with the stabilization module 520. It is noted again, however, that while these modules are depicted as separate in FIG. 5, in some implementations, these separate modules may be manufactured as a single module or as an integral part of the device 500.

As shown in the implementation of FIG. 5, the stabilization module 520 includes the components of the image stabilization system 100 described above in reference to FIG. 1. These include a camera system 110, a stabilization platform 130, a fulcrum 140, one or more actuators 150, and one or more gyroscopes 160. Generally, a user capturing an image with device 500 holds the device 500 in his or her hand and aims the camera system 110 towards the desired image scene. The user holding the device 500 by hand, however, may not be able to completely stabilize the device 500. Accordingly, images and video captured by camera system 110 may exhibit poor quality due to the unsteadiness of the user and resultant jitter. It is noted again that jitter may be caused by factors other than unsteadiness of a user's hand. For example, a camera mounted to a moving structure, for example, a car or bike, may be exhibit jitter due to the motion of the structure. The systems and methods herein disclosed lessen the effects of jitter on the captured image regardless of the source of the jitter.

The stabilization module 520, including the camera system 110, gyroscopes 160, and actuators 150, may be electrically connected to the image processing module 550. The image processing module 550 may include an image processor 553 configured to perform various processing operations on the received image data in order to output a high quality image. Image processor 553 can also be configured to receive orientation data from the one or more gyroscopes 160 and compute motion instructions for the one or more actuators 150 to stabilize the camera system 110 when jitter is detected.

Image processor 553 may be a general purpose processing unit or a processor specially designed for imaging applications. Examples of image processing operations include cropping, scaling (for example, to a different resolution), image stitching, image format conversion, color interpolation, color processing, image filtering (for example, spatial image filtering), lens artifact or defect correction, image stabilization, etc. The image processor 553 may, in some implementations, comprise a plurality of processors. Certain implementations may have a processor dedicated to each image sensor. The image processor 553 may be one or more dedicated image signal processors (ISPs) or a software implementation of a processor. In some implementations, there is no dedicated image processor 553, and the operations described herein are performed on the device processor 503.

As shown, the image processor 553 is connected to a memory 560 and a working memory 555. In the illustrated implementation of FIG. 5, the memory 560 stores capture control module 561, image stitching module 562, operating system module 563, and stabilization control module 564. These modules include instructions that configure the image processor 553 or the device processor 503 to perform various image processing and device management tasks. The working memory 555 may be used by the image processor 553 to store a working set of processor instructions contained in the modules of the memory 560. Alternatively, the working memory 555 may also be used by the image processor 553 to store dynamic data created during the operation of the device 500.

In some implementations, the capture control module 561 may include instructions that configure the image processor 553 to call the stabilization control module 564 to analyze image data and/or gyroscope data, determine image stabilization parameters, and generate actuator instructions to position (or reposition) the stabilization platform 130 and camera system 110 according to the image stabilization parameters. For example, the gyroscopes 160 positioned on the stabilization platform 130 can provide orientation or positioning data to the stabilization control module 564, and the stabilization control module 564 can analyze the orientation data to determine whether jitter is present and, if so, a frequency and/or magnitude component of the jitter. The stabilization control module 564 can then provide instructions to the one or more actuators 150 coupled to the stabilization platform 130 to compensate for the determined jitter components. In some implementations, the actuator instructions can compensate for a frequency and magnitude of jitter, for example based on a look up table with coefficients to minimize certain known frequencies that occur due to hand jitter.

In some implementations, the stabilization control module 564 compares orientation data from the gyroscopes 160 mounted on the stabilization platform to orientation data from gyroscopes mounted directly on the housing 501 to determine whether jitter is present and calculate and provide instructions to the one or more actuators 150. In some implementations, the stabilization control module 564 compares data from successively captured images to determine whether the camera system 110 is experiencing jitter and generate actuator instructions to compensate for the jitter.

In some implementations, the stabilization control module 564 may perform a feedback loop of analyzing gyroscope motion data, providing instructions to the actuator 150, analyzing gyroscope motion data while the actuator is moving the plate, and modifying the actuator instructions in order to minimize motion of the gyroscopes during image capture. Such a feedback loop may compensate for hysteresis in the actuator 150.

The capture control module 561 may further include instructions that control the overall image capture functions of the device 500. For example, capture control module 561 may include instructions that call subroutines to configure the image processor 553 to capture raw image data of a target image scene using camera system 110. If the camera system 110, is an array camera system, the capture control module 561 may then call the image stitching module 562 to perform a stitching technique on the partial images captured by each of the individual cameras of the array camera and output a stitched and cropped target image to image processor 553. The capture control module 561 may also call the image stitching module 562 to perform a stitching operation on raw image data in order to output a preview image of a scene to be captured to display 505, and to update the preview image at certain time intervals or when the scene in the raw image data changes.

The image stitching module 562 may comprise instructions that configure the image processor 553 to perform stitching and cropping techniques on captured image data. For example, each of the sensors of an array camera may capture a partial image comprising a portion of the target image according to each sensor's field of view. The fields of view may share areas of overlap, as described above. In order to output a single target image, image stitching module 562 may configure the image processor 553 to combine the multiple partial images to produce a high-resolution target image. Target image generation may occur through known image stitching techniques. Examples of image stitching can be found in U.S. Pat. No. 8,331,725, entitled "PANORAMIC IMAGING TECHNIQUES," which has previously been incorporated by reference.

For instance, image stitching module 562 may include instructions to compare the areas of overlap along the edges of the partial images for matching features in order to determine rotation and alignment of the partial images relative to one another. Due to rotation of partial images and/or the shape of the field of view of each sensor, the combined image may form an irregular shape. Therefore, after aligning and combining the partial images, the image stitching module 562 may call subroutines which configure the image processor 553 to crop the combined image to a desired shape and aspect ratio, for example a 4:3 rectangle or 1:1 square. The cropped image may be sent to the device processor 503 for display on the display 505 or for saving in the storage 507.

The operating system module 563 configures the image processor 553 to manage the working memory 555 and the processing resources of the device 500. For example, the operating system module 563 may include device drivers to manage hardware resources such as the camera system 110. Therefore, in some implementations, instructions contained in the image processing modules discussed above may not interact with these hardware resources directly, but instead interact through standard subroutines or APIs located in the operating system module 563. Instructions within the operating system module 563 may then interact directly with these hardware components. The operating system module 563 may further configure the image processor 553 to share information with the device processor 503.

In some implementations, the device 500 may incorporate some or all of the features described above to produce stabilized images. One of skill in the art, however, will appreciate that the principles disclosed above in reference to the example implementation shown in FIG. 5 can be modified and varied without departing from the scope of this disclosure.

Figure 6:
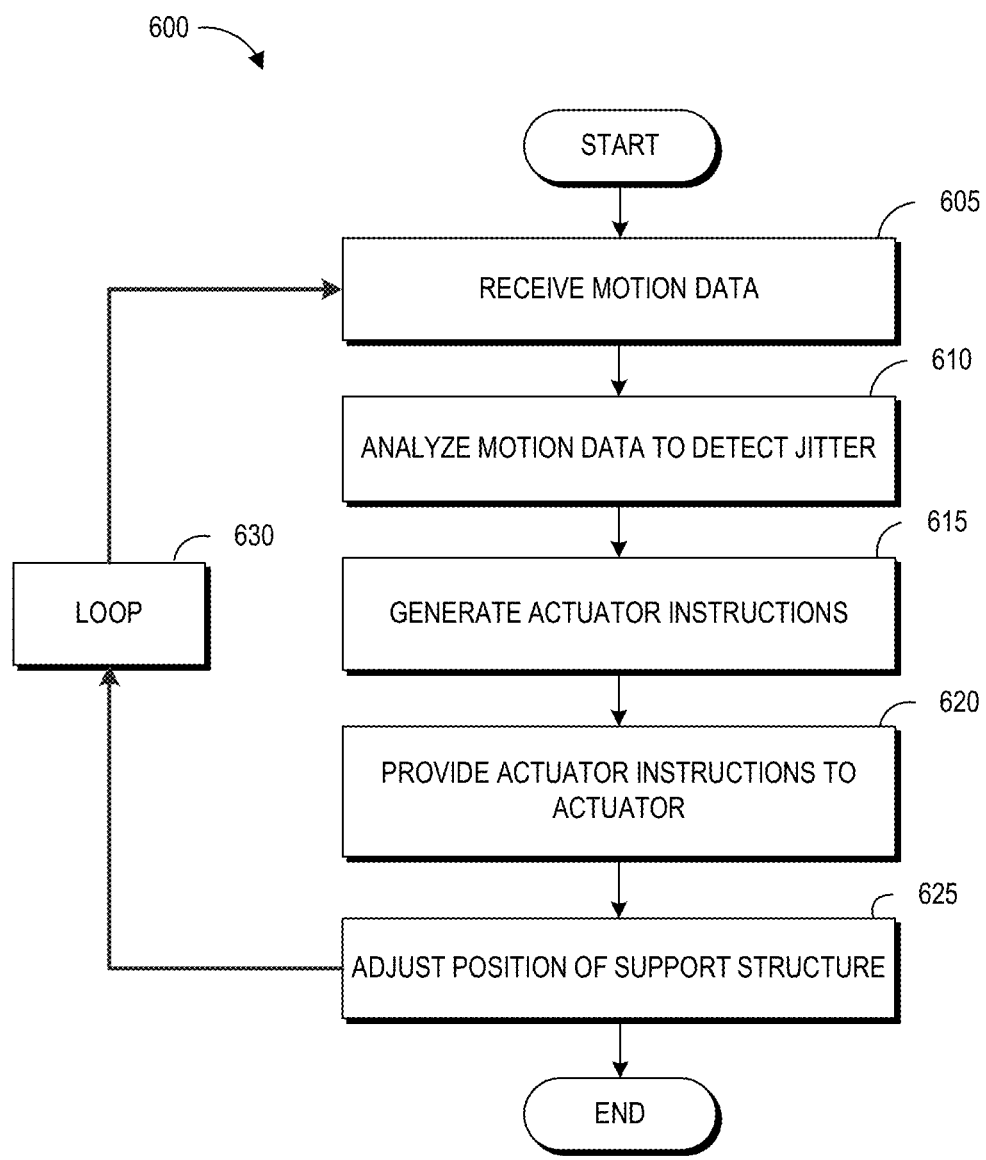
FIG. 6 is a flowchart illustrating an example of an implementation of a method for stabilizing a camera system with an image stabilization system.

FIG. 6 is a flowchart illustrating an implementation of a method 600 for stabilizing an camera system 110 with an image stabilization system 100. Reference numerals described in this section that are not shown in FIG. 6 are shown in FIG. 1, although a person of ordinary skill in the art will appreciate that method 600 can be used with any of the image stabilization systems described herein.

Method 600 begins at block 605 where motion data is received at a processor from one or more gyroscopes 160. In some implementations, the one or more gyroscopes 160 are positioned on the stabilization platform 130 and the stabilization platform 130 also supports the camera system 110. Accordingly, the one or more gyroscopes 160 generate motion data regarding the motion of the camera system 110.

At block 610, the processor analyzes the motion data to determine whether the camera system 110 is experiencing jitter. If jitter is detected, at block 615, the processor generates actuator instructions in response to the analyzed motion data. The actuator instructions are configured to counteract the detected jitter, effectively (substantially) stabilizing the camera system 110.

At block 620, the actuator instructions are provided from the processor to one or more actuators 150. At block 625, the one or more actuators move the stabilization platform 130 (and accordingly the camera system 110 attached thereto) in response to the provided actuator instructions.

Block 630 is provided to illustrate that the steps of method 600 can be performed as part of a feedback loop. For example, the steps of method 600 can be continually repeated and the positioning of the camera system 110 may be continually adjusted to correct for detected jitter in real time.

Implementing Systems and Terminology

Implementations disclosed herein provide systems, methods, and apparatus for stabilizing camera systems, including array camera systems configured to be free from parallax and tilt artifacts. One skilled in the art will recognize that these implementations may be implemented in hardware, software, firmware, or any combination thereof.

In some implementations, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image stabilization system for a camera system, comprising:
    a stabilization platform configured to support a parallax free camera system including an array of at least two cameras each configured to capture a corresponding portion of at least two portions of an image, the array having a virtual optical axis defined by optical paths of the at least two cameras;

a camera housing;

a fulcrum rotationally and pivotally connecting the stabilization platform to the camera housing and aligned with the virtual optical axis, the fulcrum configured such that the stabilization platform can tilt and rotate relative to the camera housing in at least one of a pitch direction, a roll direction, and a yaw direction;

at least one gyroscope rigidly connected to the stabilization platform to move with the stabilization platform; and at least one actuator directly coupled to the stabilization platform and configured to cause tilting or rotation of the stabilization platform in at least one of the pitch direction, the roll direction, and the yaw direction.

2. The image stabilization system of claim 1, wherein the at least one gyroscope is configured to generate motion data, the image stabilization system further comprising a processor in electronic communication with the at least one gyroscope and the at least one actuator, the processor configured to:

receive the generated motion data from the at least one gyroscope;

determine, based on analyzing the motion data, that the camera system is experiencing jitter;

generate motion instructions for the at least one actuator, the motion instructions configured to compensate for one or both of a frequency and a magnitude of the jitter; and provide the motion instructions to the actuator.

3. The image stabilization system of claim 1, wherein the at least one gyroscope includes a first, second, and third gyroscope, and wherein the at least one actuator comprises:

a first actuator configured to rotate the stabilization platform in the yaw direction;

a second actuator configured to tilt the stabilization platform in the pitch direction; and a third actuator configured to tilt the stabilization platform in the roll direction, wherein the first, second, and third gyroscopes are each positioned in a blind spot relative to the camera system to facilitate removing at least a portion of one or more of the first, second, and third gyroscopes from a captured image.

4. The image stabilization system of claim 1, wherein the fulcrum comprises a ball bearing.

5. The image stabilization system of claim 1, wherein the fulcrum comprises a fulcrum point, and wherein the fulcrum point is aligned with an optical axis of the camera system.

6. The image stabilization system of claim 1, wherein the camera system comprises an array camera.

7. The image stabilization system of claim 1, wherein the stabilization platform is configured to rotate in each of the pitch direction, the roll direction, and the yaw direction.

8. The image stabilization system of claim 1, wherein the stabilization platform is configured to not substantially obstruct a field of view of the camera system.

9. The image stabilization system of claim 1, wherein the stabilization platform comprises a substantially flat plate.

10. An image stabilization system for an array camera, comprising:

a parallax free array camera having a virtual optical axis, the array camera comprising at least two cameras, each of the at least two cameras configured to capture one of a plurality of portions of a target image of a scene, the array camera having a virtual optical axis defined by optical paths of the at least two cameras;

a support structure supporting the array camera;

a pivot member rigidly connected to the support structure, the pivot member configured to pivot in a yaw direction, a pitch direction, and a roll direction around a center of the pivot member, the center of the pivot member aligned with the virtual optical axis of the array camera;

at least one gyroscope rigidly connected to the support structure to move with the support structure, the at least one gyroscope configured to generate motion data, the motion data indicative of a motion of the support structure; and an actuator directly coupled to the support structure, the actuator configured to receive motion instructions and to rotate the support structure in the yaw direction, the pitch direction, and the roll direction around the center of the pivot member in response to the received motion instructions.

11. The image stabilization system of claim 10, further comprising:

a processor in electronic communication with the at least one gyroscope and the actuator, the processor configured to:

receive the motion data from the at least one gyroscope;

determine, based on analyzing the motion data, that the array camera is experiencing jitter;

generate the motion instructions for the actuator, the motion instructions configured to compensate for one or both of a frequency and a magnitude of the jitter; and provide the motion instructions to the actuator.

12. The image stabilization system of claim 11, further comprising a housing, wherein the housing comprises:

an internal cavity, wherein the support structure and the array camera are disposed within the internal cavity; and an aperture positioned to allow light representing the target image to pass through the aperture and into the internal cavity of the housing and to reach each of the at least two cameras, wherein the actuator is further coupled to the housing and further configured to pivot the support structure in the yaw direction, the pitch direction, and the roll direction relative to the housing.

13. The image stabilization system of claim 10, wherein the pivot member is a ball bearing.

14. The image stabilization system of claim 10, wherein the support structure comprises a plate, wherein the plate is substantially flat.

15. The image stabilization system of claim 14, wherein the pivot member is disposed on a bottom surface of the plate and the array camera is disposed on a top surface of the plate.

16. The image stabilization system of claim 14, further comprising:

a first gyroscope disposed on a first corner of the plate;

a second gyroscope disposed on a second corner of the plate;

a third gyroscope disposed on a third corner of the plate; and wherein the first gyroscope, the second gyroscope, and the third gyroscope are each positioned in a blind spot relative to each of the at least two cameras.

17. The image stabilization system of claim 10, wherein each of the at least two cameras of the array camera each comprise:

an image sensor;
a lens assembly comprising at least one lens, the lens assembly having a center of projection, the lens assembly positioned to focus light on the image sensor; and
a mirror positioned to reflect light to the lens assembly, the mirror further positioned on a mirror plane, the mirror plane positioned at a midpoint of and orthogonal to a line segment extending between the center of projection and a virtual center of projection.

18. The image stabilization system of claim 17, wherein the array camera further comprises a central reflective element having a plurality of primary light re-directing surfaces configured to split the light into the plurality of portions, wherein the mirror of each of the at least two cameras forms one of the primary light re-directing surfaces.

19. The image stabilization system of claim 17, wherein the support structure comprises a substantially flat plate, and wherein each of the at least two cameras further comprises a re-directing surface positioned to direct light from the lens assembly onto the image sensor, and wherein the image sensors of each of the at least two cameras are disposed on an upper surface of the substantially flat plate and positioned substantially parallel with the upper surface of the substantially flat plate.

20. The image stabilization system of claim 12, wherein the at least one gyroscope is disposed on the housing.

21. A method for stabilizing images formed by a parallax free array camera system supported by a stabilization platform on a fulcrum, the array camera system having a virtual optical axis defined by optical paths of at least two cameras in the array camera system and the fulcrum aligned with the virtual optical axis, the method comprising:
receiving motion data at a processor, the motion data generated by at least one gyroscope in electronic communication with the processor, the at least one gyroscope mounted on the stabilization platform;
analyzing the motion data with the processor to determine that the camera system is experiencing jitter;
generating instructions for an actuator to compensate for one or both of a frequency and magnitude of the jitter;
providing the instructions to the actuator; and
moving the stabilization platform supporting the camera system with the actuator in response to the instructions, the actuator being directly coupled to the stabilization platform.

22. The method of claim 21, wherein moving the stabilization platform comprises pivoting the stabilization platform in a pitch direction, a yaw direction, and a roll direction around a center point of a fulcrum rigidly attached to the stabilization platform, the center point aligned with an optical axis of the camera system.

23. The method of claim 22, wherein the actuator comprises a first linear actuator configured to pivot the stabilization platform in a pitch direction, a second linear actuator configured to pivot the stabilization platform in a yaw direction, and a third linear actuator configured to pivot the stabilization platform in a roll direction.

24. The method of claim 23, wherein the camera system comprises an array camera including at least two cameras, and wherein each of the cameras comprise:
an image sensor;
a lens assembly comprising at least one lens, the lens assembly having a center of projection, the lens assembly positioned to focus light on the image sensor; and
a mirror positioned to reflect light to the lens assembly, the mirror further positioned on a mirror plane, the mirror plane positioned at a midpoint of and orthogonal to a line segment extending between the center of projection and a virtual center of projection.

25. The method of claim 22, wherein the stabilization platform comprises a substantially flat plate.

26. The method of claim 23, wherein the fulcrum comprises a ball bearing mounted to a bottom surface of the stabilization platform.

27. The method of claim 21, wherein the method further comprises repeating each of the receiving, analyzing, generating, providing, and moving in a feedback loop.

28. The method of claim 21, wherein the image motion data is generated by comparing successively captured images.

29. The image stabilization system of claim 2, wherein:
the motion data generated by the at least one gyroscope comprises an orientation data and a movement data of at least one of the stabilization platform and the camera system; and
generating the motion instructions for the at least one actuator is based at least in part on the generated motion data.

30. The image stabilization system of claim 2, the processor further configured to:
prior to generating the motion instructions, analyze the motion data generated by the at least one gyroscope to determine whether the jitter is present; and
in response to determining that the jitter is present, determine the one or both of the frequency and the magnitude of the jitter.

31. The method of claim 21, wherein moving the stabilization platform comprises
moving the stabilization platform using the actuator to cause the stabilization platform to pivot around a fulcrum point in space, the fulcrum point in space not including any physical structure.

* * * * *